Figure 1:
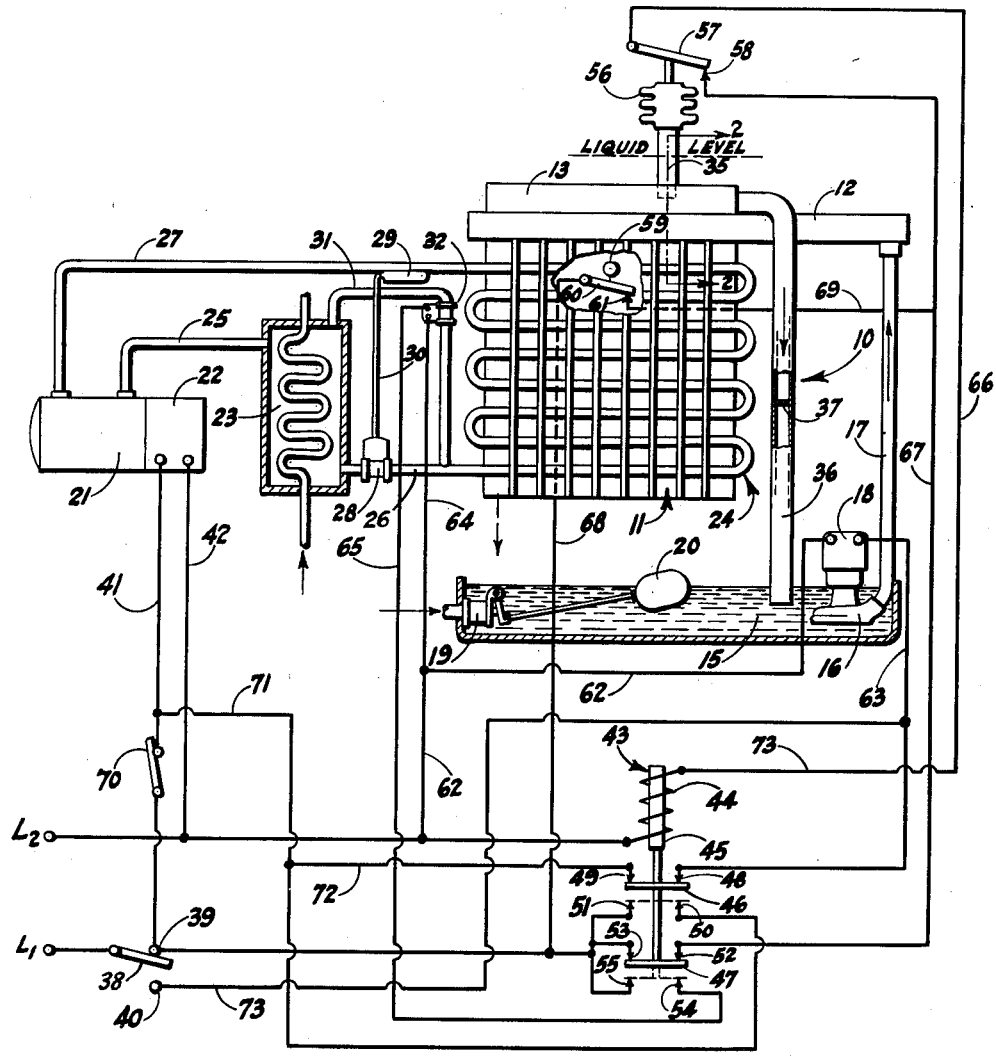

INVENTORS
CLYDE McGEHEE,
ALWIN B. NEWTON &
SAM P. SOLING.
BY
ATTORNEY

United States Patent Office 3,054,274
Patented Sept. 18, 1962

3,054,274
ICE MAKER CONTROLS
Clyde McGehee, Natchez, Miss., and Alwin B. Newton, York, and Sam P. Soling, Spring Garden Township, York County, Pa., assignors to Borg-Warner Corporation, Chicago, Ill., a corporation of Illinois
Filed Dec. 18, 1959, Ser. No. 860,585
2 Claims. (Cl. 62—138)

This invention relates to ice makers and, more particularly, to control circuits therefor.

In an ice maker, for example, of the type shown in the Grandia Patent 2,593,874, owned by the assignee of our invention, there is shown a method of controlling the freezing cycle that is completely independent of water temperatures and ambient air temperatures (down to a minimum of about 65° F.). The control serves to produce a piece of ice of a given size under the varying conditions. The Grandia control method has met with wide commercial success.

In the Grandia control method, water is frozen within a tube with excess water flowing down the interior of the tube. At such time as the water is frozen to a point to impede the flow of this excess water, the excess water then backs up and is directed in an independent path to flow over a thermostatic control bulb. When this thermostatic control bulb is chilled down to its operating point, a thermostatic switch is activated thereby to end the freezing cycle and initiate the harvesting cycle.

As was set out above, this control is simple and foolproof, not subject to variations in temperature and serves to produce a uniform piece of ice. It suffered from the disadvantage that differences in altitude had the effect of varying the control point at which the thermostatic switch is operating. In addition, operation in an ambient temperature of less than 65° F. (outdoors or unheated area), rendered the controls erratic, sluggish and subject to malfunctioning.

Applicants have now devised a control method utilizing the Grandia principles but improving thereon, in that the machine is not affected by varying altitudes and operates in ambient temperatures down to approximately 35° F.

It is an object of the invention, therefore, to provide in an automatic ice maker a control system which serves to produce a uniform piece of ice irrespective of ambient air temperatures, water temperatures, or differences in altitude.

A further object is to provide, in an automatic ice maker, a control circuit therefor which is relatively simple, low in cost, and reliable in operation. Yet another object is to provide a control circuit of the type just above mentioned and including controls not subject to varying control points due to varying conditions of operation.

In carrying out the invention, an ice maker is provided in which water is frozen in a tube with excess water flowing through the tube to a water sump for recirculation through the tube. At such time that the freezing has progressed sufficiently to impede the flow of excess water through the tube, then this excess water is received in a stand pipe provided for the purpose. The stand pipe is connected to a pressure control switch and, at such time as the water rises sufficiently in the stand pipe to compress the air therein to a design pressure, then the pressure-actuated switch operates to terminate the freezing cycle and initiate the harvesting cycle.

Figure 2:
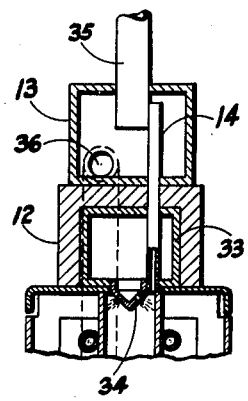

The invention consists of the novel constructions, arrangements and devices to be hereinafter described and claimed for carrying out the above-stated objects and such other objects as will appear from the following description of preferred embodiments of the invention described with reference to the accompanying drawings, in which:

FIG. 1 is a schematic diagram of an ice making machine incorporating the present invention; and FIG. 2 is a vertical section of a freezing tube, showing details of construction of the invention.

Like numerals refer to like parts throughout the two views.

An ice making apparatus 10 comprises a bank of vertical freezing tubes 11 for freezing ice. A water supply header 12 is provided for supplying water to the freezing tubes 11. A pipe 13 is provided for receiving water backed up from freezing tubes 11, and has a plurality of vertically directed lines 14 extending through said header 12 communicating with each said tube 11. Pipe 13 is supported by header 12. A water sump 15 serves to receive the excess water flowing from tubes 11. A pump 16 is provided for circulating water from sump 15 to header 12, and is connected thereto by way of a liquid line 17. Pump 16 is driven by the customary electric motor 18. Valve 19, controlled by a float 20, is connected to a source of water and opens and closes automatically to maintain a predetermined liquid level in the sump 15.

A refrigerating apparatus is provided and takes the form of a compressor 21, driven by an electric motor 22. A refrigerant condenser 23 and an evaporator 24, bonded to freezing tubes 11, form the remaining major components of the refrigerating apparatus. A hot gas line 25 leads from compressor 21 to condenser 23. The outlet of condenser 23 is connected to the inlet of evaporator 24 by way of a hot liquid line 26. The outlet of evaporator 24 leads back to compressor 21 by way of a cold gas line 27. Thermostatic control valve 28 is provided in hot liquid line 26 and is controlled by way of the usual thermostatic bulb 29 in heat-exchange relation with line 27 and attached to valve 28 by way of a capillary 30. A hot gas bypass line 31 extends between condenser 23 and hot liquid line 26 and is controlled by a normally closed solenoid valve 32.

Turning now to FIG. 2, it will be seen that water header 12 seats on freezing tubes 11. An isolating member 33 is provided within header 12 and a plurality of nozzles 34 depend from the header into each freezing tube 11. Each back up line 14 communicates on its lower end with the interior of an ice freezing tube 11 and on its upper end with the pipe 13. A stand pipe 35 communicates with pipe 13 at one end thereof. It will be apparent that the physical location of the stand pipe with respect to the header pipe is immaterial. A drain pipe 36 communicates with pipe 13 and terminates just above sump 15. Drain pipe 36 includes an orifice plate 37 therein.

Power to operate the machine is supplied from leads L1 and L2. Lead L1 is controlled by a single pole, double-throw, two-position switch 38 having contacts 39 and 40. Lines 41 and 42 are connected to leads L1 and L2 and are electrically connected to motor 22. A two-blade, double-throw solenoid switch 43 is provided, which includes a relay coil 44, a solenoid 45 and switch blades 46 and 47. Normally open contacts 48 and 49 and normally closed contacts 50 and 51 are provided for switch blade 46. Similarly, normally open contacts 52 and 53 and normally closed contacts 54 and 55 are provided for switch blade 47. Lead L1 is directly connected to contacts 51, 53 and 55. A pressure switch 56 communicates with stand pipe 35 and includes a switch blade 57 and a contact 58. A bimetallic switch 59 is placed in heat-exchange relation to freezing tubes 11, and includes a switch blade 60 and a contact 61. Switch 59 is designed to close at a temperature of approximately 70° F. and open at about 36° F.

Pump motor 18 is connected on one side thereof to lead L2 by way of a line 62. A line 63 connects the other side of the pump motor to normally open contact 48.

The hot gas solenoid valve 32 is connected on one side thereof to line 62 by way of a line 64. A line 65 leads from the other side of the valve to normally closed contact 54. Lead L2 is directly connected to one side of relay coil 44. The other side of relay coil 44 is connected to switch blade 57 of pressure switch 56 by way of a line 66. The pressure switch contact 58 is connected by a line 67 to normally open contact 52. A line 68 connects switch blade 60 of the bimetallic switch 59 to lead L1. The bimetallic switch contact 61 is connected to line 67 by way of a line 69. An ice level control switch 70 is connected into line 41 between motor 22 and lead L1. A line 71 leads from motor line 41 to normally closed contact 50. Line 71 is joined with line 41 at a point between motor 22 and ice level control switch 70. A line 72 leads from line 71 to contact 49. A line 73 leads from contact 40 of switch 38, and is joined with line 63 at a point between motor 18 and normally open contact 48.

Operation

Normally, on starting, pressure switch 56 and bimetallic switch 59 are closed. Solenoid operated switch 43 is de-energized and switch blades 46 and 47 are in their lower positions contacting normally closed contacts 50 and 51, and normally closed contacts 54 and 55 respectively. Assuming that it is desired to produce ice, the main control switch 38 is thrown to the ice making position across contact 39, as shown in FIG. 1. Ice level switch 70 will be in its closed position. Switch 70 is normally controlled by some mechanism in an ice receiving bin (not shown) to open when the bin becomes full. Such mechanisms are well known and may be of the type shown, for example, in application Serial No. 650,001 to Meldon G. Leeson, now Patent No. 2,983,109. It will be apparent that the particular method used to operate switch 70 when the ice bin is full may vary with the particular apparatus, and forms no part of the invention per se. Suffice it to say that some means is present to open switch 70 at such time as the ice bin is full.

With master switch 38 closed, motor 22 is energized by way of lines 41 and 42, and including ice level switch 70. Relay coil 44 of solenoid operated switch 43 is energized by the circuit, including lead L2, line 66, switch blade 57, part of line 67, line 69, switch blade 60 and line 68, back to lead L1 to complete the circuit. With relay coil 44 energized, switch blades 46 and 47 are raised to the upper position by solenoid 45 as shown in FIG. 1, and a circuit is set up to pump motor 18 through line 41, ice level switch 70, line 71, line 72, switch blade 46 of switch 43 and lines 63 and 62 to place it in operation. Gas compressed in compressor 21 flows by way of hot gas line 25 to condenser 23, and is condensed therein. Refrigerant liquid then flows through line 26 to evaporator 24 and has its pressure and corresponding temperature decreased in passage through thermostatic control valve 28. The now cold liquid flows through evaporator 24, picking up heat from the water flowing within freezing tubes 11, serving to congeal the liquid within the tubes. In picking up heat, the refrigerant is evaporated and the vapor flows through cold gas line 27 back to the inlet of compressor 21 to complete the refrigerant cycle.

Bimetallic switch 59 is set to open when the temperature of the freezing tubes 11 reaches approximately 36° F. At such time as the switch 59 opens, a holding circuit for relay coil 44 is set up around the switch by way of the entire line 67 and switch blade 47. Therefore, the apparatus is maintained on its freezing cycle. At such time as the water flowing within freezing tubes 11 is congealed to a point where the excess water cannot flow through the tubes, this excess water backs up through lines 14 and flows into pipe 13. With continual flow, pipe header 13 becomes full and the backed up liquid then flows into stand pipe 35. Flow through orifice plate 37 in drain pipe 36 is sufficiently limited to allow stand pipe 35 to become filled to the proper level. When it reaches a level as indicated by the liquid level line, then the pressure of the air trapped therein is sufficient to actuate pressure switch 56 to a position such that switch blade 57 is no longer in contact with contact 58. The circuit through relay coil 44 is then broken and the solenoid 45 drops to its de-energized position, as shown in dotted lines in FIG. 1. The circuit to pump motor 18, by way of contact 48, is broken and the pump ceases to operate. At the same time, hot gas solenoid valve 32 and hot gas bypass line 31 are opened by way of a circuit set up through lead L2, part of line 62, line 64, line 65, switch blade 47 and lead L1. Motor 22 remains energized and hot gas from the compressor 21 is delivered directly to evaporator 24 to free the ice therein. As soon as the ice is freed, liquid within stand pipe 35 is free to flow back into pipe 13, relieving the pressure on switch 56 and allowing the switch to close. From pipe 13 the liquid flows to sump 15 by way of drain pipe 36. When all of the ice has been freed from freezing tubes 11, then the walls of the tubes themselves begin to heat up. At such time as the temperature of the walls reaches approximately 70° F., bimetallic switch 59 is flexed to its "switch closed" position. Assuming that the ice level switch 70 is still closed, indicating that the bin is not yet full, then relay coil 44 is again energized to again initiate the freezing cycle.

Should the ice level switch 70 open during the defrosting cycle, it will be apparent that it is desirable that the apparatus continue on its defrosting cycle until all the ice has been removed from ice freezing tubes 11. The purpose of line 71 is, therefore, to set up a circuit around ice level switch 70 and through switch blade 46 (in its dotted line or defrosting position) back to lead L1 so that the compressor will continue to operate until the end of the harvesting cycle.

Although not likely, it might sometimes happen that ice level switch 70 might be opened during the freezing cycle. If this were to happen, then an inspection of FIG. 1 reveals that the circuit to electric motor 22 is immediately open, rendering the motor inoperative. An inspection of FIG. 1 reveals that the circuit to pump motor 18 also includes ice level switch 70. Should the switch open, then, in addition to motor 22 being rendered inoperative, motor 18 would also be rendered inoperative. Relay coil 44 remains energized and as soon as the ice level control switch 70 is closed, the apparatus continues on the freezing cycle.

The machine, due to various sanitary regulations, must be cleaned periodically. This can prove to be a difficult task and means have been provided to use the water circulating system of the apparatus itself for cleaning purposes. With switch 38 thrown in lower position across contact 40, a circuit to electric motor 18 is set up by way of lead L1, switch 38, line 73, line 63, line 62 and lead L2. With motor 18 in operation, pump 16 is operative to pick up water from sump 15 and circulate it through the ice freezing tubes 11. A suitable cleansing preparation can be added to the water in sump 15 in order to aid in the cleansing process.

The present method is applicable to ice makers of the type shown, for example, in the aforementioned Leeson application. An inspection of the Leeson application reveals that a single control tube is utilized for determining the freezing cycle. A control cube is formed in the tube and, when the freezing of the cube has progressed to a point that water flow through the tubes is impeded, then the water backs up the tube and is led to a thermostatic expansion bulb. When the water flows over the bulb, the bulb is chilled and a thermostatic switch is actuated to end the freezing cycle and initiate the harvesting cycle. It will be apparent that the thermostatic switch and expansion bulb could be eliminated and the pressure switch 56 could be directly connected to such a control tube. In this case, the upper part of the control tube itself acts as the stand pipe.

We wish it to be understood that our invention is not to be limited to the specific constructions and arrangements shown and described, except only insofar as the claims may be so limited, as it will be apparent to those skilled in the art that changes may be made without departing from the principles of the invention.

What is claimed is:

1. In an ice making apparatus of the character described the combination of an ice freezing tube through which liquid to be frozen flows and within which ice forms whereby the flow is restricted; a refrigerant evaporator in heat-exchange relationship with said tube; means to supply the liquid to be frozen to said tube; means forming a chamber for receiving liquid from said tube when there is a restriction to the liquid flow therethrough; control means responsive to the flow of liquid to said chamber to discontinue the freezing operation and initiate a harvesting operation, said control means including a pressure actuated switch means; means connecting said switch means with said chamber for communicating increasing pressure to said switch means due to an accumulation of liquid in said chamber; and means for draining liquid from said chamber, said means having insufficient capacity to drain said chamber as rapidly as liquid from said tube accumulates therein.

2. In an ice making apparatus of the character described the combination of a plurality of ice freezing tubes through which liquid to be frozen flows and within which ice forms whereby the flow is restricted; a refrigerant evaporator in heat-exchange relationship with said tubes; means to supply the liquid to be frozen to said tubes; means forming a chamber for receiving liquid from any one of said tubes when there is a restriction to the liquid flow therethrough; means connecting each of said tubes with said chamber; control means responsive to the flow of liquid from any one of said tubes to said chamber to discontinue the freezing operation and initiate a harvesting operation, said control means including a pressure actuated switch means; a stand pipe communicating at one end thereof with said switch means and at the other end thereof with said chamber; and means for draining liquid from said chamber, said means having insufficient capacity to drain said chamber as rapidly as liquid from any one of said tubes accumulates therein.

References Cited in the file of this patent

UNITED STATES PATENTS

| | | |
|---|---|---|
| 2,633,005 | Lauer et al. | Mar. 31, 1953 |
| 2,680,168 | Murphy | June 1, 1954 |
| 2,821,070 | Watt et al. | Jan. 28, 1958 |
| 2,921,443 | Lee | Jan. 19, 1960 |
| 2,921,447 | Gottschalk | Jan. 19, 1960 |